Nov. 15, 1960    R. J. LEE ET AL    2,960,462
DUAL FILM COMBINATIONS FOR MEMBRANE PERMEATION
Filed Sept. 30, 1957
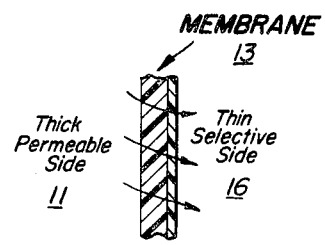
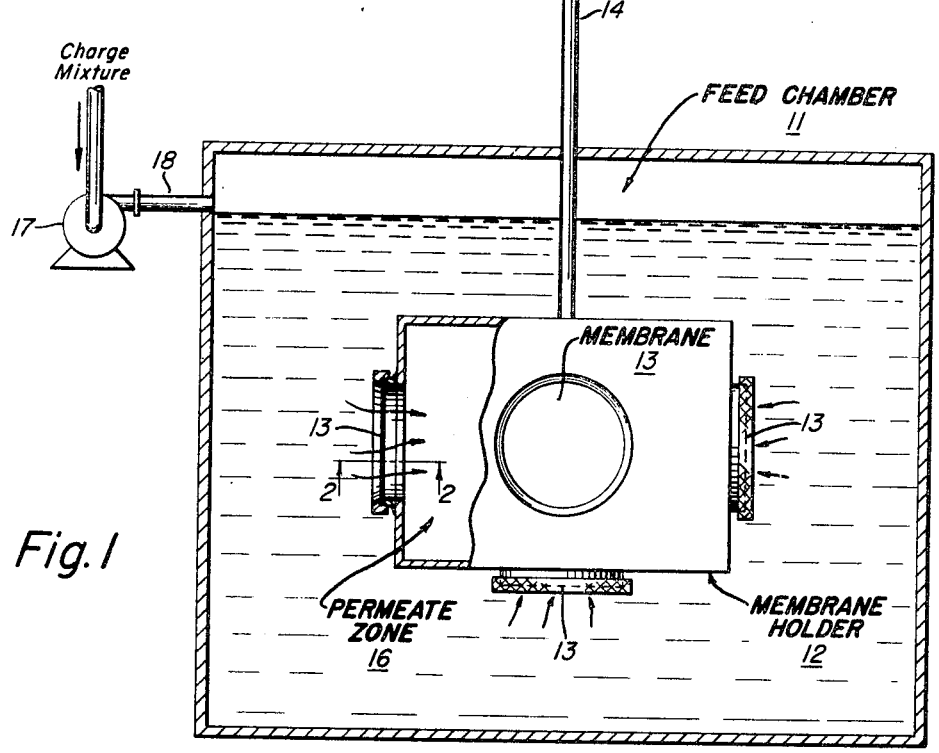
INVENTORS:
Robert J. Lee
Joseph F. Jennings
BY Joseph C Koturski
ATTORNEY

# United States Patent Office 2,960,462
Patented Nov. 15, 1960

2,960,462

DUAL FILM COMBINATIONS FOR MEMBRANE PERMEATION

Robert J. Lee, La Marque, and Joseph F. Jennings, Texas City, Tex., assignors to The American Oil Company, Texas City, Tex., a corporation of Texas Filed Sept. 30, 1957, Ser. No. 687,283

7 Claims. (Cl. 208—308)

This invention relates to a separation process and particularly concerns a permeation process for separating organic chemicals.

In separating mixtures of organic chemicals by the use of a permeation process, see for example U.S. 2,159,434 to F. E. Frey, it is known that the rate of permeation through the permeation membrane increases as the thickness of the permeation membrane decreases. To take advantage of this phenomena, very thin permeation membranes have been used, e.g. 0.5 mils or less. These very thin membranes, however, are more subject to rupture during their use in the permeation process. Rupture of the membrane may require shutdown of the permeation process and replacement of the membrane. Because the selectivity of the permeation membrane for permeating a given component of the charge mixture in preference to other components of the charge mixture is a factor of primary importance, highly selective but very thin membranes are desired. Because the highly selective membranes generally allow the permeation mixture to permeate there-through at a lower rate than do the less selective membrane materials, the need for using a very thin film of the highly selective membrane material is obvious. While the use of supporting solid materials such as screen, sintered materials, porous ceramics or the like might appear to be useful for supporting the membrane material to prevent its rupture, the surfaces of such supporting materials are generally not so polished as to remove from them all abrasive surfaces which easily tears the permeation membrane under permeation conditions.

An object of this invention is to provide an improved permeation process useful for separating organic chemical mixtures. Another object is to provide a permeation process employing permeation membranes which are not easily ruptured. A further object of this invention is to provide high-strength selective permeation membranes which provide high permeation rates even though they are of appreciable thickness. Other objects and advantages of the present invention will be apparent from the more detailed description thereof.

The present invention is based upon the concept of using laminated permeation membranes for the separation of organic chemical mixtures. The laminated membrane consists of a thin layer or film of a selective membrane material mounted upon a thicker film of a membrane material having a higher permeation rate. The layer of the membrane material having the higher permeation rate ordinarily has a poor selectivity by comparison with the layer of selective membrane material. This laminated membrane is employed so that the film layer having the higher permeation rate is in contact with the mixture of the chemicals to be separated.

It has been found that when the higher permeation rate surface of the laminated membrane is in contact with the mixture to be separated, the selectivity of the laminated membrane is greater than the selectivity of either of the component films from which the laminate is formed. If the laminate membrane were to be reversed so that the more selective membrane material were in contact with the mixture to be separated, the selectivity of the laminate membrane would then be intermediate between the selectivities of the films from which the laminate membrane is formed.

In its fundamental form, a permeation unit consists of an enclosed vessel separated into two chambers by the permeation membrane. The charge mixture to be separated is introduced into one chamber wherein it contacts one side of the permeation membrane. The permeation membrane permits the preferential permeation of one component of the charge mixture in preference to other components thereof. Thus the portion of the charge mixture which permeates through the membrane and is removed from the opposite side thereof into the permeation zone is enriched in that component of the charge mixture which permeates more rapidly. Permeation is a non-equilibrium process, i.e., the concentration of the more rapidly permeating component in contact with the charge side of the permeation membrane must be higher than the concentration of this same component in contact with the permeate side of the membrane, or otherwise permeation will not occur. Non-equilibrium conditions are usually provided for by rapidly withdrawing the permeated portion in contact with the permeate side of the membrane. As to the physical conditions employed during permeation, the charge mixture introduced into the feed zone may be in the liquid state, and the permeated portion may be removed from the opposite side of the membrane in the vapor or liquid state; or the charge mixture can be maintained in the vapor state and the permeated portion removed from the opposite side of the membrane in the vapor state. Higher pressures are employed in the feed zone than in the permeate zone. A pressure differential of from 0.5 to 50 atmospheres may exist between the feed and permeate zones. The pressure differential between the two zones requires that the permeation membrane display considerable strength. The permeation membrane is a thin film usually less than 10 mils in thickness, and generally about 0.5 to 1.0 mil or thereabouts in thickness. Temperatures as high as the permeation membrane is capable of withstanding without rupturing due to thermal instability in the presence of the mixtures undergoing separation are generally employed, since the rate of permeation increases in the neighborhood of 50% for each 10 to 20° C. increase in temperature.

The laminated membranes of the present invention may be used in separating with greater efficiency those mixtures which have heretofore been separated by conventional one-piece membranes. Organic chemicals may thus be separated by use of the laminated membranes. Hydrocarbons may be separated by type, i..e., separation of aromatic hydrocarbons from unsaturated hydrocarbons such as diolefins or olefins and/or paraffin hydrocarbons. Or a separation can be made based upon molecular configuration, i.e., a separation of branched chain aliphatic hydrocarbons from other aliphatic hydrocarbons which have a different number of branched chains present therein. The aromatic hydrocarbons permeate more rapidly than unsaturated hydrocarbons which in turn permeate more rapidly than the saturated hydrocarbons i.e. paraffins. Aliphatic hydrocarbons which have a lesser number of branched chains permeate more rapidly than those aliphatic hydrocarbons having a greater number of branched chains. With respect to the effect of molecular weight upon the rate of permeation, the lower molecular weight hydrocarbons in general tend to permeate more rapidly than the higher molecular weight hydrocarbons of the same structure. Various natural hydrocarbon oils or synthetic hydrocarbon oils can be separated by permeation. For example, petroleum naphthas, cycle oils from cracking operations, etc., can be processed by permeation. Mixtures of organic chemicals such as the organo-soluble organic chemicals including various organic oxygen-containing compounds, organic sulfur-containing compounds, organic halogen-containing compounds, organic nitrogen-containing compounds, mixtures of the above enumerated types of compounds or mixtures thereof with hydrocarbons, etc., may be charged to the permeation process for the concentration or separation of the components of such mixtures. It is apparent that the present invention is not limited to the separation of any specific mixture.

The laminated permeation membranes of the present invention are composed of two layers of permeation membrane material which have been physically or chemically bonded together. A thin layer or film of a selective membrane material (the highest degree of selectivity is ordinarily desired) is mounted upon a thicker layer or film of a membrane material which has a higher permeation rate than does the thin selective layer. The layer of membrane material which has the higher permeation rate is less selective than the thin layer of selective membrane material because it has generally been found that those membrane materials which have high permeation rates for organic chemicals display a lesser selectivity than do those permeation membranes which permit the organic chemicals to permeate therethrough at lower permeation rates. Thus, the laminated permeation membrane will be composed of a thin membrane material having a relatively high degree of selectivity and a low permeation rate which is mounted upon a thicker membrane material which displays a relatively high permeation rate and a relatively low degree of selectivity. The permeation rate of the resultant laminated membrane is limited by the permeation rate of the selective membrane layer of the laminated membrane. The selectivity of the resultant laminated membrane is higher than the selectivity of either of the component layers of membrane material provided that the laminated membrane is so used in the permeation process that the higher permeation rate film is in contact with the mixture to be separated. If the laminated membrane is reversed so that the layer of selective membrane material is in contact with the mixture to be separated then the selectivity displayed by the laminated membrane is approximately midway between the selectivities displayed by the individual films making up the laminated membrane.

Permeation is distinct from dialysis (wherein materials of colloidal size are separated from molecules which are of small size) or mass diffusion. In permeation, all of the components of the mixture to be separated permeate through the membrane. The different components making up the mixture will permeate through the membranes at different rates and thereby permeation provides a means for concentrating certain components of the mixture. Repeated processing enables the recovery of the components of a mixture in relatively pure form. The term "selectivity" (which is used herein) is a measure of how high the membrane material will concentrate a given component of the feed mixture in the permeated portion. In this respect, it is similar to the terms beta and alpha used in solvent extraction and fractionation, respectively.

Any of a number of membrane materials can be employed in forming the laminated membrane employed in the process of this invention. Examples of membrane materials are listed hereinafter, the first one listed having the highest selectivity and the lowest permeation rate and the last one listed having the highest permeation rate and the lowest selectivity: cellulose esters, cellulose ethers, polyethylene (irradiated and non-irradiated). The rate of permeation increases from the first named membrane material to the last named membrane material, and the selectivity decreases from the first named membrane material to the last named membrane material. It is apparent that other membrane materials besides those listed above may also be used. For instance, co-polymers of vinyl chloride and vinylidene chloride (which may display greater selectivity than cellulose esters), polybutadiene (which displays characteristics similar to polyethylene), co-polymers of vinylidene chloride/and acrylonitrile, etc., may be used. Examples of cellulose esters are cellulose acetate-propionate, cellulose proprionate, cellulose acetate-butyrate, cellulose butyrate, cellulose acetate-valerate, cellulose acetate-benzoate, etc. Examples of cellulose ethers are ethyl cellulose, propyl cellulose, ethyl-propyl cellulose, butyl cellulose, ethyl-butyl cellulose, amyl cellulose, benzyl cellulose, etc. Examples of some of the commercially available cellulose esters and ethers which may be used in accordance with the present invention are cellulose acetate-butyrate which contains an average of between about 0.1 to 2.0 free hydroxyl groups per anhydroglucose unit, e.g. cellulose acetate-butyrate having an average of about 0.1 to 1.0 free hydroxyl groups per anhydroglucose unit, an average of about 0.5 acetyl groups per anhydroglucose unit, and an average of from about 1.5 to 2.4 butyryl groups per anhydroglucose unit; cellulose acetate-propionate having an average of from about 1.0 to 2.0 free hydroxyl groups per anhydroglucose unit; ethyl cellulose having an average of from about 0.4 to 1.0 free hydroxyl groups per anhydroglucose unit.

The laminated membranes used in this invention may be of about the same thickness, i.e., 0.5 to 5 or 10 mils, as the non-laminated membranes used heretofore. The thin layer of selective membrane material may be from about 0.05 to 0.5 mil in thickness or thereabouts, and the thicker layer of high permeable membrane material may be from about 0.5 to 1 or 2 mils in thickness. Conventional lamination techniques may be used. The films can be pressed into intimate physical contact, with or without the application of heat. They can be bonded together by other techniques. For example, a thin film of the selective materials may be cast from a solution unto a thicker layer of the highly permeable membrane material.

To illustrate the effectiveness of the present invention, a number of examples are shown hereinafter which demonstrate the practical advantages of the invention.

In the accompanying drawings which form a part of this specification,

Figure 1 is a schematic section through the permeation system, and

Figure 2 is a detailed section taken along the lines 2—2 of Figure 1 showing that the membrane is laminated with its thick permeable layer exposed to the feed zone and its thin selective layer exposed to the permeate zone.

Attached Figure 1 represents in schematic form a small size permeation apparatus which was used in carrying out the permeation runs. The permeation apparatus consisted of a box-like feed chamber 11 for the feed mixture of liquid hydrocarbons introduced therein; a smaller size membrane holder 12 of box-like shape having 5 open faces across which the permeation membranes 13 prepared in a manner to be described were sealed, the 6th face having sealed thereto a line 14 for removing the portion which permeates through the membrane into the interior (permeate zone 16) of the membrane holder, the entire membrane holder being positioned within feed chamber 11. Pump 17 passes the charge mixture (which has been heated to the desired permeation operating temperature) through line 18 into feed chamber 11 until the liquid level of the charge mixture is substantially above membrane holder 12. The permeated portion is continuously withdrawn from permeate zone 16 through line 14 by means of vacuum pump 19. Manometer 21 and pressure regulating valve 22 measure and regulate the pressure in permeate zone 16. The total surface area provided by the membranes was approximately 22 sq. in. In the permeation experiments, the charge to the feed zone consisted of a 50–50 mixture of methylcyclohexane and isooctane. A temperature of 100° C. was maintained in the feed zone and atmospheric pressure was maintained therein. The permeate zone was maintained at a pressure of 30 mm. Hg abs. Hydrocarbons which permeated through the membrane were removed from the opposite side of the membrane and into the permeate zone as vapors. The vapors were withdrawn continuously and their compositions were determined.

A number of permeation runs were carried out using the permeation apparatus and the permeation conditions described in the preceding paragraph. In run No. 1, the permeation membrance was Irrathene 201 (polyethylene of 2 mils thickness which had been subjected to a radiation dosage level of 15 megaroentgents per sq. cm. of surface area). In run No. 2, the permeation membrane was Ethocel 610 (ethyl cellulose having an ethoxyl content of about 45–46% by weight). In run No. 3 a laminated permeation membrane prepared by pressing the Irrathene 201 and the Ethocel 610 films together into intimate physical contact was used. In this run, the more selective Ethocel 610 surface of the laminated membrane was in contact with the liquid feed hydrocarbon mixture. In run No. 4, the same laminated membrane was used as was employed in run No. 3, except that the laminated membrane was reversed so that the higher permeation rate Irrathene 201 side of the laminated membrane was in contact with the liquid mixture of feed hydrocarbons. The compositions of the permeated fractions produced in the runs and the permeation rates were determined. These results are shown in Table I, which follows:

59.1% methylcyclohexane and was approximately midway between the selectivities of the individual film materials which made up the laminated membrane. In run No. 4, in which the highly permeable polyethylene side of the same laminated membrane was in contact with the feed mixture to be separated, the permeate contains 64.1% methylcyclohexane. This concentration of metaylcyclohexane in the permeate was higher than that obtained in runs No. 1, 2 and 3. The reason for this phenomenon is not completely understood.

An additional series of permeation runs was carried out using the same permeation apparatus and permeation operating conditions. In run No. 5, the permeation membrane was G–100 ethyl cellulose (having an ethoxyl content of about 44.5–45.5 wt. percent, and was 0.5 mil in thickness. In run No. 6, the permeation membrane was a laminated membrane prepared by casting an organic solvent solution containing 0.6% of cellulose acetate-butyrate (Eastman AB–503–15 having 0.45 hydroxyl groups, 0.45 acetyl groups and 1.7 butyryl groups per each anhydroglucose unit) unto a film of 0.5 mil thickness G–100 ethyl cellulose. The ethyl cellulose film which was thus coated with a film of cellulose acetate-butyrate of 0.1 mil in thickness was dried and employed as the permeation membrane. In run No. 6, the more selective acetate-butyrate side of the laminated membrane was in contact with the feed mixture to be separated. In

*Table I*

| Run No. | Membrane | Composition | | Permeation Rate [1] |
|---|---|---|---|---|
| | | Charge | Permeate | |
| 1 | Irrathene 201 | 50% MCH [2]<br>50% I [2] | 57% MCH<br>43% I | 1800 |
| 2 | Ethocel 610 | 50% MCH<br>50% I | 62% MCH<br>38% I | 208 |
| 3 | Laminated Membrane:<br>Ethocel 610 (upstream) [3]<br>Irrathene 201 (downstream) [3] | 50% MCH<br>50% I | 59.1% MCH<br>39.9% I | 208 |
| 4 | Laminated Membrane:<br>Irrathene 201 (upstream) [3]<br>Ethocel 610 (downstream) [3] | 50% MCH<br>50% I | 64.1% MCH<br>35.9% I | 160 |

[1] Rate in gallons of permeate product/hour/1000 sq. ft. of membrane surface.
[2] MCH=methylcyclohexane; I=isooctane.
[3] Upstream signifies that side of the membrane which is in contact with the liquid feed mixture; downstream signifies that side of the membrane in contact with the permeate zone.

It is evident from the above results that the particular side of the laminated membrane which is in contact with the feed mixture to be separated is of critical importance in obtaining a high selectivity of operation. In run No. 3 in which the higher selectivity ethyl cellulose side of the laminated membrane was in contact with the feed mixture to be separated, the composition of the permeate was run No. 7, this same laminated membrane material, as was used in run No. 6, was also employed. However, in run No. 7, the relatively highly permeable ethyl cellulose side of the laminated membrane was in contact with the hydrocarbon mixture to be separated. The compositions of the permeated portions and the permeation rates obtained in these runs are shown in Table II, which follows:

*Table II*

| Run No. | Membrane | Composition | | Permeation Rate [1] |
|---|---|---|---|---|
| | | Charge | Permeate | |
| 5 | Ethyl cellulose G–100 | 50% MCH [2]<br>50% I | 64% MCH<br>36% I | 200 |
| 6 | Laminated membrane:<br>Cellulose acetate-butyrate (upstream) [3]<br>Ethyl cellulose (downstream) [3] | 50% MCH<br>50% I | 63.5% MCH<br>36.5% I | 180 |
| 7 | Laminated membrane:<br>Ethyl cellulose (upstream)<br>Cellulose acetate-butyrate (downstream) | 50% MCH<br>50% I | 67.2% MCH<br>32.8% I | 180 |

[1] Rate in gallons of permeate/hour/1000 sq. ft. of membrane surface.
[2] MCH=methylcyclohexane; I=isooctane.
[3] Upstream indicates the side of membrane in contact with the charge mixture; downstream indicates the side of membrane in contact with permeate zone.

It should be noted again from a comparison of the above runs that by employing the laminated permeation membrane with its more highly permeable side in contact with the feed mixture to be separated, that a much better selectivity of separation is obtained.

While the invention has been described with reference to the separation of certain organic chemicals using certain laminated membrane materials, it is to be understood that the invention is not limited thereto, but includes the separation of other organic chemical mixtures using other laminated membranes such as would be apparent from the specification to those skilled in the art.

Thus having described the invention what is claimed is:

1. A process for the separation of chemical mixtures which comprises contacting a feed mixture of liquid organic chemicals with one side of a dual layer laminated plastic permeation membrane under permeation conditions and removing from the opposite side of said laminated membrane a permeated portion of the said mixture which is enriched in one component of the mixture, the laminated permeation membrane being a thin film of permeable plastic membrane material mounted upon a thicker film of permeable plastic membrane material, the surface of said thicker film of the laminated membrane being in contact with the feed mixture to be separated, said thin film being more selective than said thicker film for the permeation of one component of the feed mixture, and said thicker film having a higher permeation rate per unit thickness than said thin film.

2. The process of claim 1 wherein the mixture of organic chemicals comprises a mixture of hydrocarbons.

3. The process of claim 1 wherein the thin membrane material is ethyl cellulose and the thicker membrane material is polyethylene.

4. The process of claim 1 wherein the thin membrane material is cellulose acetate-butyrate and the thicker membrane material is ethyl cellulose.

5. The method of separating one component of a liquid mixture from another component thereof, which method comprises contacting said mixture with the thick-film side of a laminated semi-permeable membrane whose total thickness is in the range of about .5 to 10 mils, said membrane comprising a thin first plastic film layer bonded to a thicker layer of a second plastic film layer, said first layer being more selective for permeating a liquid than the second layer and the second layer being more permeable to the liquid than the first layer, said second layer constituting said thick-film side of the membrane, and removing vapors of permeated liquid from the thin-film side of said membrane.

6. The method of claim 5 wherein the thin-film layer is about .05 to .5 mil in thickness.

7. The method of claim 5 wherein the thick-film layer is cross-linked polyethylene.

References Cited in the file of this patent

UNITED STATES PATENTS

| 2,386,826 | Wallach et al. | Oct. 16, 1945 |
| 2,475,990 | Robertson | July 12, 1949 |

OTHER REFERENCES

Simril et al.: Modern Plastics, vol. 27, No. 10, June 1950, pages 156 and 158.